United States Patent
Kumar et al.

(10) Patent No.: US 9,417,630 B2
(45) Date of Patent: Aug. 16, 2016

(54) SYSTEMS AND METHODS FOR HANDLING MALFUNCTIONS

(71) Applicant: General Electric Company, Schenectady, NY (US)

(72) Inventors: Ajith Kuttannair Kumar, Erie, PA (US); David Allen Eldredge, Melbourne, FL (US); Glenn Robert Shaffer, Erie, PA (US); Joseph Forrest Noffsinger, Grain Valley, MO (US)

(73) Assignee: General Electric Company, Schenectady, NY (US)

( * ) Notice: Subject to any disclaimer, the term of this patent is extended or adjusted under 35 U.S.C. 154(b) by 126 days.

(21) Appl. No.: 14/284,537

(22) Filed: May 22, 2014

(65) Prior Publication Data

US 2015/0338848 A1 Nov. 26, 2015

(51) Int. Cl.
| | |
|---|---|
| *G05D 1/00* | (2006.01) |
| *B60K 28/10* | (2006.01) |
| *B61L 15/00* | (2006.01) |
| *G07C 5/08* | (2006.01) |
| *G08G 1/00* | (2006.01) |
| *B61L 23/00* | (2006.01) |
| *B61L 27/00* | (2006.01) |
| *B61L 3/00* | (2006.01) |

(52) U.S. Cl.
CPC .............. *G05D 1/0055* (2013.01); *B60K 28/10* (2013.01); *B61L 15/0081* (2013.01); *B61L 23/00* (2013.01); *B61L 27/0088* (2013.01); *B61L 27/0094* (2013.01); *G07C 5/0816* (2013.01); *B61L 3/006* (2013.01); *G08G 1/20* (2013.01)

(58) Field of Classification Search
None
See application file for complete search history.

(56) References Cited

U.S. PATENT DOCUMENTS

| | | | |
|---|---|---|---|
| 4,003,019 A | 1/1977 | Tronel | |
| 4,042,810 A | 8/1977 | Mosher | |
| 4,279,395 A | 7/1981 | Boggio et al. | |
| 4,561,057 A | 12/1985 | Haley, Jr. et al. | |
| 4,602,335 A | 7/1986 | Perlmutter | |
| 4,718,351 A | 1/1988 | Engle | |
| 4,944,474 A | 7/1990 | Jones | |
| 5,392,716 A * | 2/1995 | Orschek | B60L 3/12 105/49 |
| 6,158,822 A | 12/2000 | Shirai et al. | |
| 6,631,322 B1 | 10/2003 | Arthur et al. | |
| 6,732,023 B2 | 5/2004 | Sugita et al. | |
| 6,748,303 B2 | 6/2004 | Hawthorne | |
| 7,092,801 B2 * | 8/2006 | Kane | B61L 3/008 246/122 R |
| 7,219,067 B1 | 5/2007 | McMullen et al. | |
| 8,401,720 B2 | 3/2013 | Daum et al. | |
| 2003/0055666 A1 * | 3/2003 | Roddy | B61L 27/0094 705/305 |
| 2004/0024515 A1 | 2/2004 | Troupe et al. | |

(Continued)

*Primary Examiner* — Fadey Jabr
*Assistant Examiner* — Kevin P Mahne
(74) *Attorney, Agent, or Firm* — GE Global Patent Operation

(57) ABSTRACT

A method comprises receiving an alarm state from one or more inspection systems that inspects one or more components of a vehicle system. The method then identifies operational parameters of the vehicle system. The operational parameters represent at least one of a current location of the vehicle system, a current terrain over which the vehicle system is currently travelling, an upcoming terrain that the vehicle system is travelling toward, a current moving speed of the vehicle system, a position of one or more controls of the vehicle system, a state of a brake of the vehicle system or an identification of one or more vehicle units in the vehicle system. The method then selects and implements a mitigating action to implement from plural different mitigating actions based on the alarm state and the one or more parameters of the vehicle.

20 Claims, 3 Drawing Sheets

(56) References Cited

U.S. PATENT DOCUMENTS

| | | | |
|---|---|---|---|
| 2004/0164206 A1* | 8/2004 | Jammu | B60L 3/0023 246/167 R |
| 2004/0243664 A1 | 12/2004 | Horstemeyer | |
| 2005/0120904 A1 | 6/2005 | Kumar et al. | |
| 2005/0125113 A1* | 6/2005 | Wheeler | B61L 3/127 701/19 |
| 2006/0025903 A1* | 2/2006 | Kumar | B61L 15/0081 701/19 |
| 2007/0203621 A1* | 8/2007 | Haugen | B61L 25/025 701/19 |
| 2007/0219680 A1* | 9/2007 | Kumar | B61L 3/006 701/19 |
| 2009/0267777 A1* | 10/2009 | Kumar | G08B 21/06 340/576 |
| 2010/0153419 A1* | 6/2010 | Daum | G06F 17/30575 707/758 |
| 2012/0089537 A1 | 4/2012 | Cooper et al. | |
| 2012/0136515 A1 | 5/2012 | Noffsinger et al. | |
| 2013/0261842 A1* | 10/2013 | Cooper | B61L 15/0081 701/1 |
| 2013/0342362 A1* | 12/2013 | Martin | B61L 15/0027 340/870.16 |
| 2014/0358336 A1* | 12/2014 | Otsubo | B61C 17/12 701/19 |
| 2015/0170521 A1* | 6/2015 | McQuade | G08G 1/20 701/29.6 |

* cited by examiner

SYSTEMS AND METHODS FOR HANDLING MALFUNCTIONS

FIELD

Embodiments of the subject matter described herein relate to powered systems.

BACKGROUND

Vehicle systems can include automobiles, rail vehicles, and various off-highway vehicles, such as, but not limited to, marine vehicles, agriculture vehicles, and the like. The vehicle systems often include a power unit, such as an engine. With respect to a rail vehicle, the power unit may be a locomotive, which may be part of a train that further includes a plurality of non-powered rail cars, such as freight cars.

In order to achieve a desired level of performance and efficiency, the vehicle system may use a trip or mission plan to map segments of the journey from one destination to another. The trip plan includes several junctions in which a different route may be taken. The trip plan also includes desired operating characteristics for the vehicle system, such as braking and tractive effort, specific to each segment of the trip.

Locomotives are complex systems with numerous subsystems dependent upon one another. One or more of the subsystems may malfunction while the vehicle system executes the trip plan. A malfunction may compromise the safety of the vehicle system and/or may detrimentally influence performance and efficiency.

An operator is usually aboard the vehicle system to ensure proper operation as the vehicle system travels to the destination. In addition to ensuring proper operation of the vehicle system, the operator may be responsible for implementing the operational characteristics defined in the trip plan. To perform these functions, the operator generally must have extensive knowledge and experience with operating the vehicle system.

However, even with knowledge to assure safe operation of the vehicle system, the operator may not react to the malfunction in a safe or efficient manner. Additionally, depending on the nature of the malfunction, the operator may not have all of the information necessary to make a safe and/or cost-effective decision.

BRIEF DESCRIPTION

In an embodiment, a method for handling malfunctions is disclosed. The method comprises receiving an alarm state from one or more inspection systems that inspects one or more components of a vehicle system. The alarm state indicates at least one of a type of alarm, a severity of the alarm, or a location of a defect causing the alarm. The method then identifies one or more operational parameters of the vehicle system. The operational parameters represent at least one of a current location of the vehicle system, a current terrain over which the vehicle system is currently travelling, an upcoming terrain that the vehicle system is travelling toward, a current moving speed of the vehicle system, a position of one or more controls of the vehicle system, a state of a brake of the vehicle system, or an identification of one or more vehicle units in the vehicle system. The method then selects with one or more computer processors, a selected mitigating action to implement. The selected mitigating action is selected from plural different mitigating actions based on the alarm state and the one or more parameters of the vehicle. The method then implements, with one or more computer processors, the mitigating action in response to the alarm state.

In an embodiment, a system includes a guidance controller. As used herein, the terms "controller" and "system" include a hardware and/or software system that operates to perform one or more functions. For example, a system, controller, or system may include one or more hardware circuits or circuitry that include and/or are connected with one or more computer processors, or other logic-based device that performs operations based on instructions stored on a tangible and non-transitory computer readable storage medium, such as a computer memory. Alternatively, a system or system may include a hard-wired device that performs operations based on hard-wired logic of the device. The systems shown in the attached figures may represent the hardware that operates based on software or hardwired instructions, the software that directs hardware to perform the operations, or a combination thereof.

In an embodiment, a system for handling malfunctions is disclosed. The system includes a vehicle system having an inspection system configured to inspect one or more components of the vehicle system to generate an alarm state based on characteristics of the one or more components. The system includes a guidance controller configured to identify one or more operational parameters of the vehicle system, a current terrain over which the vehicle system is travelling toward, a current moving speed of the vehicle system, a position of one or more controls of the vehicle system, a state of a brake of the vehicle system, or an identification of one or more vehicle units in the vehicle system. The system also includes an action manager communicably coupled to the inspection system and the guidance controller. The action manager is configured to select the one or more mitigating actions to implement selected from plural different mitigating actions based on the alarm state and the one or more operational parameters of the vehicle system. The action manager is also configured to implement the mitigating action in response to the alarm state.

BRIEF DESCRIPTION OF THE DRAWINGS

The foregoing summary, as well as the following detailed description of various embodiments of the presently described subject matter, will be better understood when read in conjunction with the appended drawings. To the extent that the figures illustrate diagrams of functional blocks of various embodiments, the functional blocks are not necessarily indicative of division between hardware circuitry.

The inventive subject matter described herein will be better understood from reading following description of non-limiting embodiments, with reference to the attached drawings, wherein.

DETAILED DESCRIPTION

Figure 1:
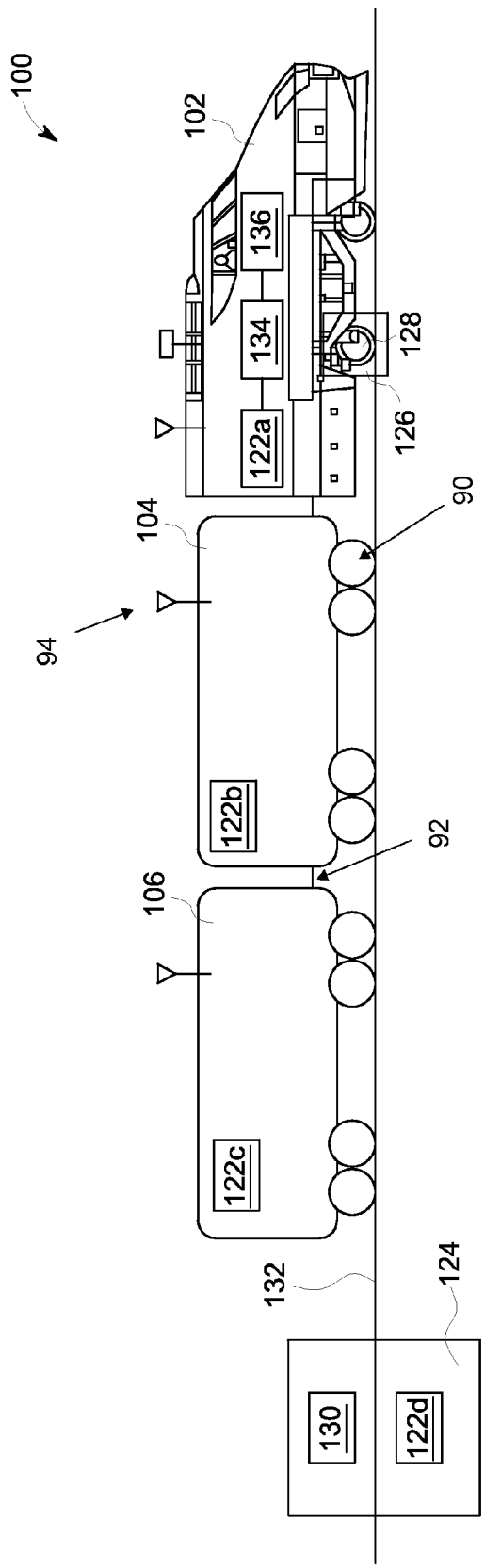
FIG. 1 depicts a schematic view of a vehicle system in accordance with an embodiment.

One or more embodiments of the inventive subject matter described herein provide systems and methods for governing the movement of a vehicle system when a malfunction is detected. Although one or more embodiments of the present inventive subject matter describe rail vehicle systems, the embodiments described herein are not limited to locomotives or to trains. In particular, one or more embodiments may be implemented in connection with different types of rail vehicles (for example, a vehicle that travels on one or more rails, such as railcars, powered ore carts and other mining vehicles, light rail transit vehicles, and the like) and other vehicles and vehicle systems that are not rail vehicles.

The term "vehicle system" may include two or more vehicles that operate together to travel along a route. The term "consist" can refer to a group of vehicles that are mechanically and/or logically linked together to travel along a route. According to various aspects of the inventive subject matter described herein, a consist may be defined based on one or more of the following: mechanical linkages, where vehicles in a consist are mechanically linked and adjacent to at least one other vehicle in the consist; electrical linkages, where vehicles are electrically linked for possibly transferring electrical power between the vehicles; and/or operational/functional linkages, where plural vehicles are controlled in a coordinated manner, for example, certain modes of distributed power operations. As one example, in a rail vehicle context, a locomotive consist may include multiple locomotives that are mechanically (and possibly electrically) linked together, with each locomotive linked and adjacent to at least one other locomotive in the consist. For example, a consist of vehicles, or a vehicle consist, may include two or more vehicles that are mechanically coupled with each other and/or that communicate with each other over one or more wired and/or wireless connections to coordinate control of tractive efforts and/or braking efforts of the vehicles in the consist. A vehicle system can include one or more vehicle consists, such as a train that includes two or more motive power groups formed from two or more locomotives mechanically linked together with each other. The vehicle system may include powered and non-powered rail cars, such as freight cars. The term "lead vehicle" refers to a vehicle that controls operations of one or more vehicles in the vehicle system, and does not necessarily mean the vehicle disposed at a front or leading end of a vehicle system. For example, a lead locomotive in a train may not be disposed at the front end of a train. The term "remote vehicle" refers to a vehicle other than the lead vehicle in a vehicle system. For example, a remote vehicle may include a locomotive that is controlled by a lead locomotive in a train. The term "remote" does not require a predetermined spacing or separation between items. For example, a remote vehicle may be directly coupled with a lead vehicle.

Additionally, "software" or "computer program" as used herein includes, but is not limited to, one or more computer readable and/or executable instructions that cause a computer or other electronic device to perform functions, actions, and/or behave in a desired manner. The instructions may be embodied in various forms such as routines, algorithms, systems or programs including separate applications or code from dynamically linked libraries. Software may also be implemented in various forms such as a stand-alone program, a function call, a servlet, an applet, an application, instructions stored in a memory, part of an operating system or other type of executable instructions. "Computer" or "processing element" or "computer device" as used herein includes, but is not limited to, any programmed or programmable electronic device that can store, retrieve, and process data. "Non-transitory computer-readable media" include, but are not limited to, a CD-ROM, a removable flash memory card, a hard disk drive, a magnetic tape, and a floppy disk. "Computer memory," as used herein, refers to a storage device configured to store digital data or information which can be retrieved by a computer or processing element. "Controller," "unit," and/or "system," as used herein, may refer to the logic circuitry and/or processing elements and associated software or program involved in controlling an energy storage system. The terms "signal," "data," and "information" may be used interchangeably herein and may refer to digital or analog forms.

One or more of the embodiments described herein disclose a vehicle system as described above. The vehicle system may be a rail vehicle, such as a train, forming a consist as described above. The vehicle system includes an inspection system configured to monitor one or more components of the vehicle system. The inspection system generates an alarm when one or more of the components malfunction. The vehicle system also includes a guidance controller having a trip plan that lists operational parameters to be used by the vehicle system as the vehicle system travels to a destination. The vehicle system also includes an action manager that uses the operational parameters to select the one or more mitigating actions to implement when the alarm is triggered.

An operator is usually aboard the vehicle system, and is typically aboard the lead locomotive. However, from this vantage point, the operator may not be able to visually inspect the source of the malfunction to assess the severity of the malfunction. The operator may not react to the malfunction in a safe and/or efficient manner. For example, in response to a broken wheel type malfunction, the operator may aggressively apply the brake, which may lead to further damage, and/or derailment of the vehicle system. As another example, the vehicle system may experience several malfunctions concurrently. For example, the vehicle system may experience a hydraulic brake pressure leak as well as a hot bearing. In response, the operator may be apply the brakes. While applying the brakes may alleviate the hot bearing, it may worsen the hydraulic brake pressure leak. Instead, a more efficient and safer option may be to divert the vehicle system to a different route that has a hill or incline such that the vehicle system can come to a rest without applying the brakes. However, the operator may not be aware that a different route with a hill is available.

By practicing various embodiments described herein, safer and/or more efficient operation with reduced reliance on operator skill may be achieved. At least one technical effect of embodiments described herein includes reduced risk in operation of a vehicle system. A technical effect of embodiments described herein is an increase in efficiency of operation of a vehicle system. A technical effect of embodiments includes improved execution of trip or mission plans. A technical effect of embodiments includes improved relational decision-making. A technical effect of embodiments includes improved response to malfunctions of a vehicle system. A technical effect of embodiments includes a reduction of fuel consumption by a vehicle system. A technical effect of embodiments includes reduction of derailment of a vehicle system.

FIG. 1 depicts a schematic view of a vehicle system 100 in accordance with an embodiment. In the illustrated embodiment, the vehicle system 100 includes rail vehicles 102, 104, and 106. But the vehicle system 100 may include more or fewer rail vehicles. The illustrated embodiment also shows the rail vehicle 102 as a locomotive. In other embodiments, one or more of rail vehicles 104 and 106 may be locomotives, and may form a consist as discussed above or may be any other type of rail vehicle. The vehicles 102-106 are mechanically linked to travel together.

Figure 2:
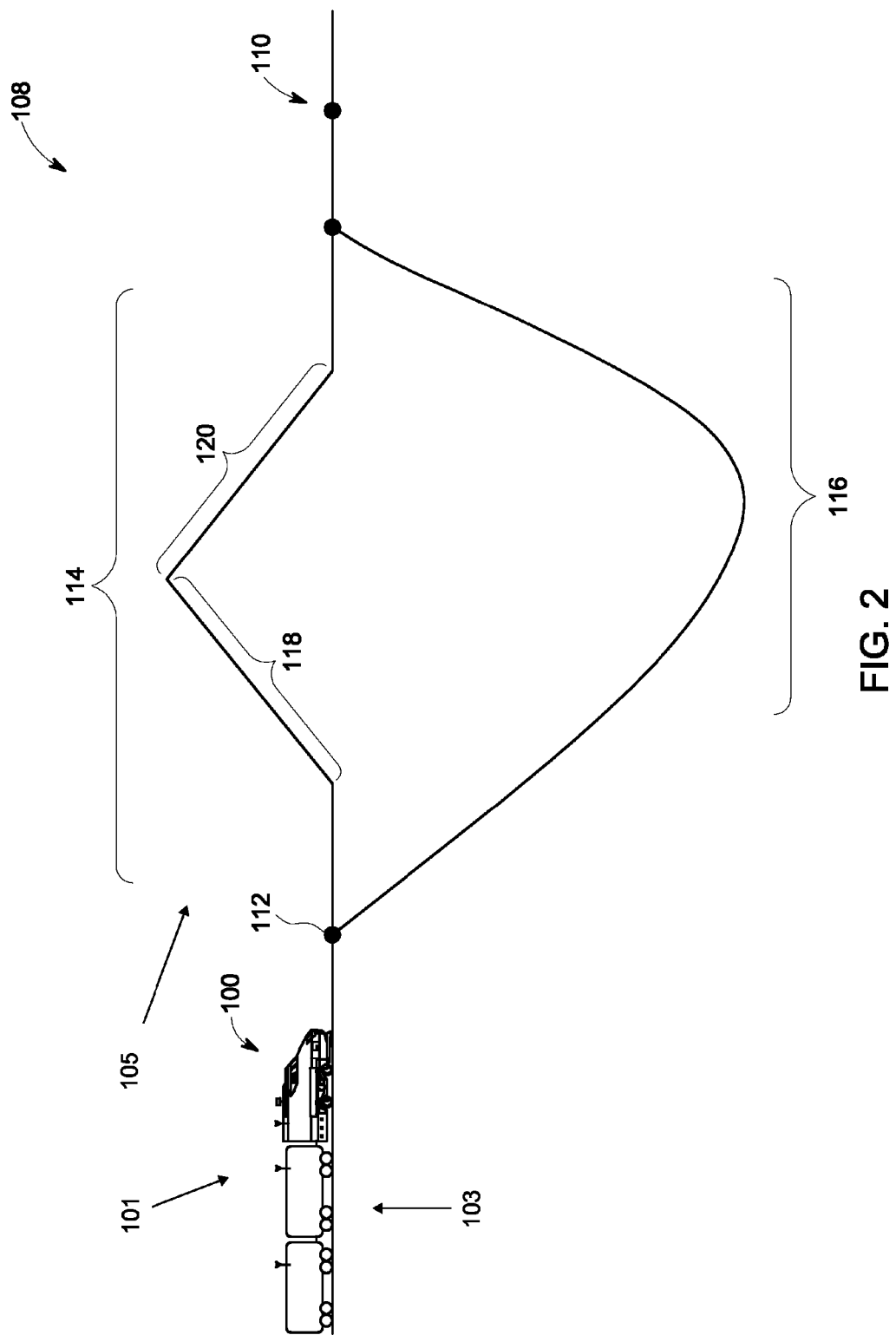
FIG. 2 is an illustration of a trip map in accordance with an embodiment.

FIG. 2 is an illustration of a trip map 108. The trip map 108 illustrates various courses the vehicle system 100 may take to arrive at a destination 110. The trip map 108 may be used by a trip plan that lists various operational parameters to be used by the vehicle system 100. The trip plan provides operational parameters that may provide safe and/or energy efficient method of travel. For example, the trip plan may govern the speed, power settings, braking effort, and the like. The trip plan may be based on information relating to the vehicle system 100 (e.g., size, number of vehicles, mass, length, weight distribution, propulsive and braking capabilities, and/ or the like). The trip plan also includes information relating to the terrain and locations the vehicle system 100 is intended to travel. For example, the locations may include tunnels, mountainous terrain, speed limits, residential areas, crossings, and/ or the like.

In the illustrated embodiment, the trip map 108 includes a junction 112 upon which the vehicle system 100 may choose between a first route 114 and a second route 116 to take to arrive at the destination 110. But the trip map 108 may include other routes and/or other junctions. The first route 114 may be a different length or distance than the second route 116. For example, the first route 114 may define a shorter path between the junction 112 and the designation 110 than the second route 116. The first route 114 may also include changing terrain elevation (e.g., mountains, valleys, and/or the like). A current location 101 of the vehicle system 100 may be the geographic location of the vehicle system 100 along the first route 114 before the vehicle system 100 passes the junction 112. The current location 101 may include a current terrain 103 that may be a current elevation as discussed below. The first route also includes upcoming terrain 105. The first route 114 has an ascending portion 118 and a descending portion 120. The ascending portion 118 may have first grade that increases in elevation, and the descending portion 120 may have a second grade that is different than the first grade (e.g., a grade that decreases in elevation). The trip map 108 may also indicate locations having populated areas, crossings, building, and/or the locations of other vehicle systems. As such, the trip plan may use information in the trip map 108 to dictate whether the vehicle system 100 should take the first route 114 or the second route 116.

Additionally, the trip plan prescribes operational parameters to be used by the vehicle system 100 at different locations as the vehicle system 100 progresses to the destination 110. For example, operational parameters may include a predetermined amount of tractive and/or braking effort to apply. Specifically, the trip plan may suggest a predetermined amount of tractive effort to apply as the vehicle system 100 approaches and climbs the ascending portion 118. Accordingly, in anticipation of the ascending portion 118, the trip plan may prescribe a predetermined amount of tractive power, or may suggest a predetermined speed in order to climb the ascending portion 118, and recover from the descending portion 120 in an energy efficient and safe manner.

Returning to the discussion of the vehicle system of FIG. 1 with continued reference to FIG. 2, the vehicle system 100 may include several systems with numerous subsystems dependent upon one another. The systems and subsystem may include various components that support the operation of the vehicle system 100. Non-limiting examples of the components include wheels 90, drawbars 92, antennae 94, bearings, slides, information systems, electrical systems, and/or the like. One or more of the subsystems may malfunction during the execution of the trip plan. A malfunction may detrimentally influence performance and efficiency, as well as compromise the safety of the vehicle system 100. Various aspects of embodiments described herein respond to the malfunctions.

The vehicle system 100 includes one or more inspection systems 122. The illustrated embodiment shows the inspection system 122a on the locomotive 102, the inspection system 122b on the rail vehicle 104, the inspection system 122c on the rail vehicle 106, and the inspection system 122d on a wayside device 124. But, the inspection systems 122 may be onboard one vehicle or distributed among several or select vehicles. In various embodiments, the vehicle system 100 may include more or fewer inspection systems 122.

The inspection systems 122 are configured to inspect one or more components of the vehicle system 100. The components of the vehicle system 100 may include any component, system, or sub-system of the vehicles 102, 104, and/or 106 as described above. The inspection systems 122 inspect the components by monitoring characteristics associated with the component, which may vary based on the type of component.

The inspection systems 122 may include various sensors configured to monitor the characteristics of the components. The sensors may be communicably coupled to the inspection systems 122 (e.g., through a wireless or wired link). The inspection system 122a may include a sensor 126 configured to monitor characteristics of a wheel 128. For example, the sensor 126 may be an optical sensor configured to sense the rotation speed of the wheel 128. As another example, the sensor 126 may be an infrared sensor configured to detect a heat signature of the wheel 128 and/or a bearing (not shown) within the wheel 128. As another example of a sensor, the inspection system 122d on the wayside device 124 may include a sensor 130 configured to sense characteristics of tracks 132 (e.g., rails) upon which the vehicle system 100 travels. Characteristic of the tracks 132 may include, but is not limited to, a radius of curvature, a measure of levelness (e.g., out of plane movement of the tracks 132), a temperature associated with the tracks 132, a measure of moisture content (e.g., flooded track sensor), a continuity measurement (e.g., detection of a discontinuity or break in the tracks 132), and/or the like.

The inspection systems 122 may generate an alarm state based on characteristics of the components. The alarm state may include an alarm type, an alarm severity, and an alarm location, among other information. Generally, the alarm type indicates a category associated with the alarm (e.g., type of component that is monitored and/or the nature of the alarm). For example, the alarm type may include, but is not limited to, a hot bearing, flat wheel, broken wheel, stuck brake, broken rail, hot rail temperature, harmonic rocking detection, dragging equipment detection, slide anomaly, derailment detection, high wind, flooded track, hydraulic pressure leak, and/or the like.

The alarm state may include the alarm severity. The alarm severity may represent the intensity of the alarm. The alarm severity may be an indexed or normalized value (e.g., bound between an upper and lower value) describing the urgency of the alarm. The alarm severity may be based on information sensed by the sensors 126, 130. For example, the alarm severity may represent a temperature sensed by the sensor 126. The alarm severity may be a descriptive label based on information received by the sensors 126, 130. For example, the alarm severity may be "low," "elevated," "high," or "critical," based on a temperature sensed by the sensor 126. But other descriptive labels are possible based on other information.

The alarm state may include the alarm location. The alarm location may represent the physical or geographic location of a defect causing the alarm. For example, the alarm type may be a bent rail type alarm as sensed by the sensor 130. In this example, the alarm location may be the estimated geographic location of the bent rail. As another example, the alarm type may be a stuck wheel type alarm as sensed by the sensor 126. In this example, the alarm location may identify the wheel 128 on the locomotive 102.

The vehicle system 100 includes a guidance controller 134. The guidance controller may be configured to identify the one or more operational parameters. As discussed above in relation to FIG. 2, the operational parameters govern the movement of the vehicle system 100 as the vehicle system 100 executes the trip plan. The operational parameters may be predetermined in the trip plan and may change as the vehicle system 100 progresses along the first route 114 or the second route 116 to the destination 110. For example, the operational parameters may include a current geographic location 101 of the vehicle system 100. The operational parameters may include a current terrain type associated with first and second routes 114 and 116. The terrain type may include elevation (e.g., altitude) information, precipitation levels, population density, and/or the like. The operational parameters may also include suggested propulsive commands or settings. For example, the operational parameters may include a current moving speed of the vehicle system, an acceleration rate, and/or the like. The optional parameters may also include a position or state of one or more controls of the vehicle system. The controls may include operator-interfacing controls, such as governors, throttle controls, and/or the like. The operational parameters may also include a state of a brake of the vehicle system (e.g., a measure of braking effort). The operation parameters may include an identification code associated with of one or more other vehicle units in the vehicle system 100. For example, the identification code may include a train reporting number, a headcode, and/or the like.

The vehicle system 100 includes an action manager 136. The action manager 136 may be communicably coupled to the inspection systems 122 and the guidance controller 134. The action manager 136 is configured to select one or more mitigating actions to implement in response to the alarm state. The mitigating action may be selected from a plurality of different mitigating actions. The action manager 136 receives the alarm state from the inspections systems 122. When an alarm state is received from one of the inspection systems 122, the action manager 136 selects or determines one or more mitigating actions to implement. The mitigating actions are based on the alarm state and one or more of the operational parameters. The mitigating action or actions may include changes to the operational parameters. For example, a mitigating action may be a reduction in speed. As another example, a mitigating action may be to take a different route than prescribed by the trip plan. In this example, the trip plan may dictate that the vehicle system 100 take the first route 114. However, in response to, for example, a hot bearing alarm, the mitigating action may be to take the second route 116.

In order to select the mitigating action, the action manager 136 may calculate a quantifiable risk assessment index. The action manager 136 may score and rank the mitigating actions based on the risk assessment index. The action manager 136 may then choose the mitigating action from the plurality of mitigating actions based on the value of the risk assessment index. As such, the mitigating action may be selected from plural different mitigating actions, in which each of the plural different mitigating actions may have an associated quantifiable risk assessment index. The risk assessment index may be based on at least one of a magnitude of a safety risk (e.g., a measure of a consequence of an action or inaction) or an immediacy of the safety risk (e.g., the likelihood that the risk will be realized) of the vehicle system 100 based on the alarm state and one or more of the operational parameters. For example, the safety risk may be based on the alarm type, alarm location, and/or the alarm severity. Specifically, a hot bearing alarm that has a "critical" severity may result in a greater safety risk than a hot bearing alarm type having a low severity.

The action manager 136 may select the mitigating action based on the risk assessment index of each of the plural different mitigating actions. A risk assessment index having a greater value may result in a more drastic mitigating action than a risk assessment index having a lower value. For example, a drastic mitigating action may be to change the planned route the vehicle system 100 is expecting to take (e.g., change from the first route 114 to the second route 116). As another example, the mitigating action may be to stop the vehicle system 100. Specifically, in the hot bearing alarm example, the hot bearing may result in a greater risk assessment index value because the hot bearing may result in derailment of the vehicle system 100. In response, the action manager 136 may cause the vehicle system 100 to travel over a less congested area having fewer buildings or other vehicle systems, or lower population. For example, the vehicle system 100 may change from the planned first route 114 to the second route 116, wherein the second route 116 may be less congested than the first route 114.

The action manager 136 may weigh the alarm state and the one or more operational parameters to determine the risk assessment index. Additionally, the action manager 136 may implement the mitigating action when the risk assessment exceeds a predetermined threshold. For example, the action manager 136 may assign a greater weight to a broken wheel type alarm, than a stuck brake type alarm. Once a weighted value exceeds a predetermined threshold, the action manager 136 may implement one or more mitigating actions. For example, after a plurality of stuck brakes in the aggregate exceeds the predetermined threshold, the action manager 136 may take a mitigating action.

The action manager 136 may base the mitigating action on the operational parameters. The mitigating action may change as the vehicle system 100 executes the trip plan and progresses toward the destination 110. For a common alarm state, when the one or more operational parameters indicate that the vehicle system 100 is travelling toward a first grade, such as the ascending portion 118 of the first route 114, a first mitigating action is selected from along the plural different mitigating factors. When the one or more operational parameters indicate that the vehicle system 100 is travelling over or toward a different, second grade, such as the descending portion 120, a different, second mitigating action is selected. For example, in response to the hot bearing alarm, the first mitigating action may be applied when the vehicle system 100 is travelling over the ascending portion 118 may be to limit the propulsive powered applied to the wheel 128 affected by the hot bearing. Then, when the vehicle system 100 is traveling over the descending portion 120, the second mitigating action, may be to limit the speed of the vehicle system 100.

The action manager 136 may select a mitigating action that includes reducing the current moving speed of the vehicle system 100 by an amount that is proportional to the severity of the alarm. As such, the speed of the vehicle system 100 may be more aggressively limited for severe alarms, and more modestly limited for less severe alarms. For example, in response to the hot bearing alarm, the speed of the vehicle system 100 maybe limited based on the temperature of the wheel 128 and/or the bearing.

The action manager 136 may choose the mitigating action based on the speed of the vehicle system 100. The plural different mitigating actions may be associated with plural different speeds of the vehicle system 100, and the selected mitigating action is selected from among the plural different mitigating actions based on the current speed of the vehicle system 100. For example, in response to a stuck brake type alarm, the action manager 136 may respond by applying more propulsive power at high speeds, and may stop the vehicle system 100 at low speeds.

The action manager 136 may present the mitigating action to the operator. The operator may intervene and may change the operational settings as suggested by the action manager 136. Alternatively, the action manager 136 may implement the mitigating action without operator intervention. For example, for time-critical and/or severe alarms, the action manager 136 may automatically implement the selected mitigating action.

Figure 3:
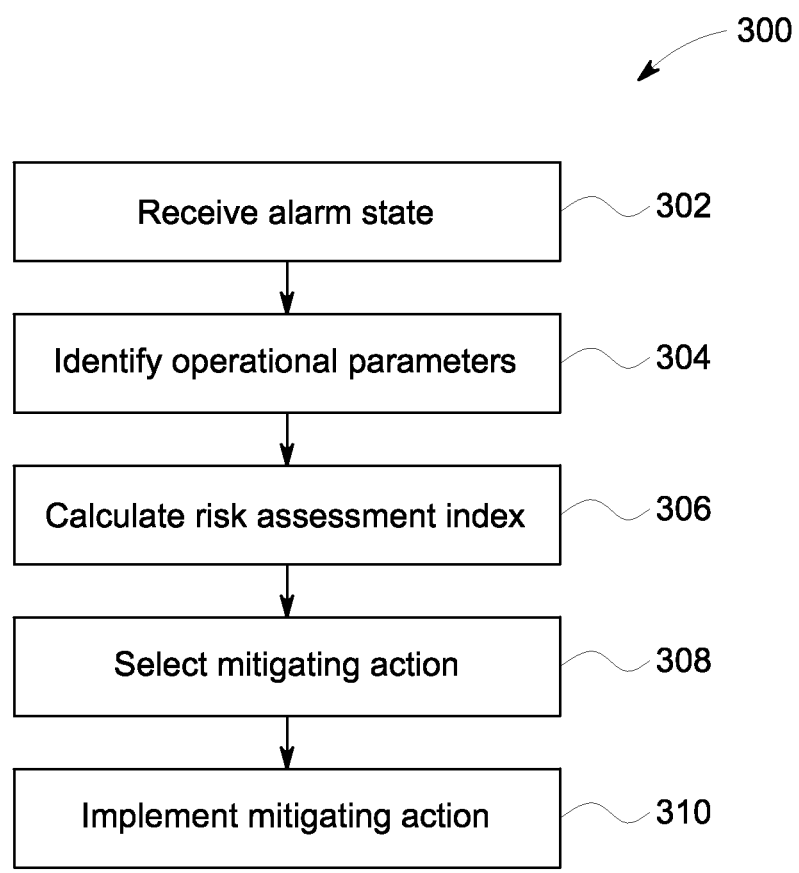
FIG. 3 is a flowchart of a method for handling malfunctions of a vehicle system, in accordance with an embodiment.

FIG. 3 is a flowchart of an embodiment of a method 300 for handling malfunctions of a vehicle system 100. The method 300 may be performed, for example, using certain components, equipment, structures, or other aspects of embodiments discussed above. In certain embodiments, certain steps may be added or omitted, certain steps may be performed simultaneously or concurrently with other steps, certain steps may be performed in different order, and certain steps may be performed more than once, for example, in an iterative fashion.

At 302, an alarm state is received. The alarm state may be received from one or more inspection systems that inspect one or more components of a vehicle system. The alarm state indicates at least one of a type of alarm, a severity of the alarm, or a location of the defect causing the alarm. After the alarm state is received, the method 300 proceeds to 304.

At 304, one or more operational parameters of the vehicle system may be identified. The operational parameters represent at least one of a current location of the vehicle system, a current terrain over which the vehicle system is currently travelling, an upcoming terrain that the vehicle system is travelling toward, a current moving speed of the vehicle system, a position of one or more controls of the vehicle system, a state of a brake of the vehicle system or an identification of one or more vehicle units in the vehicle system. After the operational parameters are identified, the method 300 may proceed to 306.

Optionally at 306, the method 300 may calculate a quantifiable risk assessment index representative of at least one of a magnitude of a safety risk or an immediacy of the safety risk of the vehicle system based on the alarm state and the one or more operational parameters. Calculating the risk assessment index may comprise weighing the alarm state and the one or more operational parameters, and implementing the mitigating action when the risk assessment exceeds a predetermined threshold. After the risk assessment index has been calculated, the method 300 may proceed to 308.

At 308, a mitigating action is selected. Optionally, the selected mitigating action may be selected from among the plural different mitigating actions based on the quantifiable risk assessment index. Optionally, the selected mitigating action may be selected from among the plural different mitigating actions based on the quantifiable risk assessment index. As yet another option, the plural different mitigating actions may be associated with plural different moving speeds of the vehicle system, and the selected mitigating action is selected from among the plural different mitigating actions based on a current speed of the vehicle system. As yet another option, the mitigating action may include reducing the current moving speed of the vehicle system by an amount that is proportional to the severity of the alarm. As yet another option, for a common alarm state, when the one or more operational parameters indicate that the vehicle system is travelling toward a first grade, a first mitigating action is selected from among the plural different mitigating actions, and when the one or more operational parameters indicate that the vehicle system is travelling over or toward a different, second grade, a different, second mitigating action is selected from among the plural different mitigating actions. As yet another option, the selected mitigating action may include changing a route being travelled on by the vehicle system from a first route to a second route. The first route headed toward an area that is more congested with at least one of other vehicle systems or buildings than the second route. After the mitigating action has been selected, the method proceeds to 310.

At 310, one or more computer processors implement the first mitigating action in response to the alarm state.

In one aspect, the systems and methods handle malfunctions while a vehicle system, such as the vehicle system 100 is en route to one or more destinations, such as the destination 110. The examples below are intended to be illustrative and non-limiting.

In one aspect, for example, the inspection systems 122 may determine that the vehicle system 100 is experiencing harmonic rocking (e.g., rocking or rolling). Harmonic rocking occurs when variations in the levelness of tracks, such as the tracks 132, coincide with a natural resonance frequency of one or more of the vehicles 102-104 or the vehicle system 100. The resonance may cause one or more of the wheels to lift, leading to derailment. Harmonic rocking may be excited at various speeds (e.g., a critical speed), as the speed may cause resonance at the natural frequency of the vehicle system 100.

When the inspection systems 122 detects harmonic rocking, the inspection systems 122 generates an alarm state with a harmonic rocking alarm type and an alarm severity indicating the amount of rocking detected and/or the critical speed at which the rocking occurs. Accordingly, the guidance controller 134 may identify portions along the trip plan that include the critical speed. The action manager 136 may choose a mitigating action to avoid the critical speed. For example, one mitigating action may be to prohibit and/or otherwise discourage the vehicle system 100 from travelling at the critical speed. Another mitigating action may be to select a second, different route, such as the second route 116 that may not require the vehicle system 100 to travel at the critical speed.

As another example, the inspection systems 122 may determine that the wheel 128 is experiencing a hot bearing type malfunction. The inspection systems 122 may include a thermal (e.g., an infrared sensor) the sensor 126 to monitor the heat signature of the wheel 128. When the heat signature indicates that a bearing is malfunctioning, the inspection systems 122 may generate an alarm state having a hot bearing type alarm. In certain embodiments, the alarm severity may be the temperate associated with the bearing and/or the wheel 128. In other embodiments, the alarm severity may be an enumeration based on the temperature. For example, the enumerations may be "low," "elevated," "high," or "critical," and may be based on the temperature and/or the likelihood of failure of the wheel 128.

The guidance controller 134 may provide operational information identifying segments of the trip plan that may include varying terrain, such as the ascending portion 118 and the descending portion 120 along the first route 114. Optionally, the guidance controller 134 may identify segments of the trip plan that include populated areas, congested areas, or areas having other vehicle systems.

The action manager 136 may select a mitigating action based on the alarm state received from the inspection systems 122 and the operational information received from the guidance controller 134. The mitigating action may be to stop the vehicle system 100. As another option, the mitigating action may be to limit the current moving speed to an amount that is proportional to the severity of the alarm. For example, the speed may be limited aggressively for high or critical levels, and modestly for low levels. As another option, the mitigating action may be to change from travelling from travelling over the planned first route 114 to travelling over the second route 116 which may have level terrain, and hence reduce the risk of derailment. As another example, the first route 114 may be headed toward an area that is more congested, populous, or has other vehicle systems than the second route 116. As such, the mitigating action may be to take the second route 116.

Optionally, the action manager 136 may calculate the risk assessment index. The risk assessment index may be based on the magnitude of a safety risk or an immediacy of the safety risk. The magnitude of the safety risk may be a measure of the consequence that may result from the alarm state. For example, a large magnitude of the safety risk may be attributed to the hot bearing causing failure of the wheel 128, leading to derailment of the vehicle system 100, and potentially fouling an adjacent track. Conversely, a smaller magnitude of safety risk may be attributed to loss of energy (e.g., fuel) efficiency. The immediacy of the safety risk may indicate the likelihood that the consequence will be realized. For example, the likelihood of the hot bearing causing derailment may be low, whereas, the likelihood that the hot bearing will reduce energy efficiency may be high. Optionally, the action manager 136 may weigh the risks. For example, the action manager 136 may assign a greater weighing factor to the magnitude of the safety risk than the immediacy of the safety risk.

The action manager 136 may then select one or more mitigating actions. Optionally, the action manager 136 may present the mitigating action to the operator. As another option, the action manager 136 may implement the mitigating action without operator intervention.

As another example, the inspection systems 122 may determine the locomotive 102 is experiencing a hot brake malfunction. The alarm severity may be the temperature associated with the brake. Optionally, the alarm severity may be an enumeration based on the temperature.

In response to the hot brake alarm state, the action manager 136 may select a mitigating action. The action manager 136 may communicate with the guidance controller 134 to determine the operational parameters expected along the first route 114, which the vehicle system 100 may take. The operational parameters include the type of approaching terrain and speeds suggested by the trip plan. The action manager 136 may then change the operational parameters, such as, for example to limit the speed of the vehicle system 100.

As another example, the inspection systems 122 may determine that portions of the tracks 132 along the first route 114 contain a hazard (e.g., the tracks 132 are flooded, broken, or otherwise impassable). For example, the sensor 130 may be configured to detect moisture, a discontinuity in the tracks 132, and/or the like. The inspection system 122 may generate an alarm state having hazardous track type alarm, and a "critical" type severity.

In response, the action manager 136 may select a mitigating action. The action manager 136 may communicate with the guidance controller 134 to determine alternate routes that are available. The action manager 136 may then change the trip plan to travel along the second route 116 that does not include the hazard.

The embodiments described herein may be part of a trip optimizer, may be a stand-alone competent that interacts with a trip optimizer, or may be a stand-alone component that does not interact with a trip optimizer.

In an embodiment, a method (e.g., for handling malfunctions) includes receiving an alarm state from one or more inspection systems that inspects one or more components of a vehicle system. The alarm state indicates at least one of a type of alarm, a severity of the alarm, or a location of a defect causing the alarm.

The method may then identify one or more operating parameters of the vehicle system. The operational parameters represent at least one of a current location of the vehicle system, a current terrain over which the vehicle system is currently travelling, an upcoming terrain that the vehicle system is travelling toward, a current moving speed of the vehicle system, a position of one or more controls of the vehicle system, a state of a brake of the vehicle system, or an identification of one or more vehicle units in the vehicle system.

The method may then select with one or more computer processors, a mitigating action to implement. The selected mitigating action may be selected from plural different mitigating actions based on the alarm state and the one or more operational parameters of the vehicle system.

The method many then implement with the one or more computer processors, the mitigating action in response to the alarm state.

Optionally, the method may further calculate a quantifiable risk assessment index that is representative of at least one of a magnitude of a safety risk, or an immediacy of the safety risk of the vehicle system based on the alarm state and the one or more operational parameters.

Optionally, the method may select the mitigating action from among the plural different mitigating actions based on the quantifiable risk assessment index.

Optionally, the method may calculate the quantifiable risk assessment index by weighing the alarm state and the one or more operational parameters, and implement the mitigating action when the risk assessment exceeds a predetermined threshold.

Optionally, the method may include plural different mitigating actions that are associated with plural different moving speeds of the vehicle system. The selected mitigating action is selected from among the plural different mitigating actions based on a current speed of the vehicle system.

Optionally, the selection of the mitigating actions may include reducing the current moving speed of the vehicle system by an amount that is proportional to the severity of the alarm.

Optionally, for a common alarm state, when the one or more operational parameters indicate that the vehicle system is travelling toward a first grade, a first mitigating action is selected from among the plural different mitigating actions. When the one or operational parameters indicate that the vehicle system is travelling over and toward a different, second grade, a different, second mitigating action is selected from among the plural different mitigating actions.

Optionally, the selected mitigating action includes changing a route being travelled on by the vehicle system from a first route to a second route. The first route may be headed toward an area that is more congested with at least one of other vehicle systems or buildings than the second route.

In an embodiment a system (e.g., for handling malfunctions) includes a vehicle system having an inspection system configured to inspect one or more components of the vehicle system to generate an alarm state based on characteristics of the one or more components.

The system includes a guidance controller configured to identify one or more operational parameters of the vehicle system. The operational parameters represent at least one of a current location of the vehicle system, a current terrain over which the vehicle system is currently travelling, an upcoming terrain that the vehicle system is travelling toward, a current moving speed of the vehicle system, a position of one or more controls of the vehicle system, a state of a brake of the vehicle system, or an identification of one or more other vehicles units in the vehicle system.

The system also includes an action manager communicably coupled to the inspection system and the guidance controller. The action manager configured to select one or more mitigating actions to implement selected from plural different mitigating actions based on the alarm state and the one or more optional parameters of the vehicle system. The action manager is also configured to implement the mitigating action in response to the alarm state.

Optionally, the action manager is further configured to calculate a quantifiable risk assessment index representative of at least one of a magnitude of a safety risk, or an immediacy of the safety risk of the vehicle system based on the alarm state and the one or more operational parameters.

Optionally, the selected mitigating action is selected from among the plural different mitigating actions based on the quantifiable risk assessment index.

Optionally, the calculation of the quantifiable risk assessment index may further include weighing the alarm state and the one or more operational parameters, and implementing the mitigating action when the risk assessment exceeds a predetermined threshold.

Optionally, the plural different mitigating actions are associated with plural different moving speeds of the vehicle system. Additionally, the selected mitigating action is selected from among the plural different mitigating actions based on a current speed of the vehicle system.

Optionally, the selected mitigating action includes reducing the current moving speed of the vehicle system by an amount that is proportional to the severity of the alarm.

Optionally, for a common alarm state, when the one or more operational parameters indicate that the vehicle system is travelling toward a first grade, the action manager may select a first mitigating action from among the plural different mitigating actions. When the one or operational parameters indicate that the vehicle system is travelling over and toward a different, second grade, a different, second mitigating action is selected from among the plural different mitigating actions.

Optionally, the mitigating action selected by the action manager includes changing a route being travelled on by the vehicle system from a first route to a second route. The first route may be headed toward an area that is more congested with at least one of other vehicle systems or building than the second route.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended clauses, along with the full scope of equivalents to which such clauses are entitled. In the appended clauses, the terms "including" and "in which" are used as the plain-English equivalents of the respective terms "comprising" and "wherein." Moreover, in the following clauses, the terms "first," "second," and "third," etc. are used merely as labels, and are not intended to impose numerical requirements on their objects. Further, the limitations of the following clauses are not written in means-plus-function format and are not intended to be interpreted based on 35 U.S.C. §112 (f), unless and until such clause limitations expressly use the phrase "means for" followed by a statement of function void of further structure.

This written description uses examples to disclose several embodiments of the inventive subject matter, and also to enable one of ordinary skill in the art to practice the embodiments of inventive subject matter, including making and using any devices or systems and performing any incorporated methods. The patentable scope of the inventive subject matter is defined by the clauses, and may include other examples that occur to one of ordinary skill in the art. Such other examples are intended to be within the scope of the clauses if they have structural elements that do not differ from the literal language of the clauses, or if they include equivalent structural elements with insubstantial differences from the literal languages of the clauses.

The foregoing description of certain embodiments of the present inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, controllers or memories) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "an embodiment" of the presently described inventive subject matter are not intended to be interpreted as excluding the existence of additional embodiments that also incorporate the recited features. Moreover, unless explicitly stated to the contrary, embodiments "comprising," "comprises," "including," "includes," "having," or "has" an element or a plurality of elements having a particular property may include additional such elements not having that property.

What is claimed is:

1. A method comprising:
    receiving an alarm state from one or more sensors that inspect one or more components of a vehicle system, the alarm state indicating at least one of a type of alarm, a severity of the alarm, or a location of a defect causing the alarm;
    identifying one or more operational parameters of the vehicle system, the operational parameters representing at least one of a current location of the vehicle system, a current terrain over which the vehicle system is currently travelling, an upcoming terrain that the vehicle system is travelling toward, a current moving speed of the vehicle system, a position of one or more controls of the vehicle system, a state of a brake of the vehicle system, or an identification of one or more vehicle units in the vehicle system;

selecting, with one or more computer processors, a selected mitigating action to implement, the selected mitigating action selected from plural different mitigating actions based on the alarm state and the one or more operational parameters of the vehicle system, wherein, for a common alarm state, a first mitigating action is selected from among the plural different mitigating actions responsive to the one or more operational parameters indicating that the vehicle system is travelling toward or over a first grade and a different, second mitigating action is selected from among the plural different mitigating actions responsive to the one or more operational parameters indicating that the vehicle system is travelling over or toward a different, second grade; and implementing, with the one or more computer processors, the mitigating action in response to the alarm state.

2. The method of claim 1, further comprising calculating a quantifiable risk assessment index representative of at least one of a magnitude of a safety risk or an immediacy of the safety risk of the vehicle system based on the alarm state and the one or more operational parameters.

3. The method of claim 2, wherein the selected mitigating action is selected from among the plural different mitigating actions based on the quantifiable risk assessment index.

4. The method of claim 2, wherein calculating the quantifiable risk assessment index further comprises weighing the alarm state and the one or more operational parameters, and implementing the mitigating action responsive to the risk assessment exceeding a predetermined threshold.

5. The method of claim 1, wherein the plural different mitigating actions are associated with plural different moving speeds of the vehicle system, and the selected mitigating action is selected from among the plural different mitigating actions based on the current moving speed of the vehicle system.

6. The method of claim 5, wherein the selected mitigating action includes reducing the current moving speed of the vehicle system by an amount that is proportional to a severity of the alarm.

7. The method of claim 1, wherein the selected mitigating action includes changing a route being travelled on by the vehicle system from a first route to a second route, the first route headed toward an area that is more congested with at least one of other vehicle systems or buildings than the second route.

8. A system comprising:
a guidance controller configured to identify one or more operational parameters of a vehicle system, the operational parameters representing at least one of a current location of the vehicle system, a current terrain over which the vehicle system is currently travelling, an upcoming terrain that the vehicle system is travelling toward, a current moving speed of the vehicle system, a position of one or more controls of the vehicle system, a state of a brake of the vehicle system, or an identification of one or more vehicle units in the vehicle system; and
one or more processors communicably coupled to one or more sensors of the vehicle system and coupled to the guidance controller, the one or more processors configured to select one or more mitigating actions to implement selected from plural different mitigating actions based on an alarm state generated by the one or more sensors based on characteristics of one or more components of the vehicle system and based on the one or more operational parameters of the vehicle system, the one or more processors also configured to implement the mitigating action in response to the alarm state, wherein the one or more processors are further configured to select a first mitigating action from among the plural different mitigating actions responsive to the one or more operational parameters indicating that the vehicle system is travelling toward a first grade, and to select a second mitigating action that is different from the first mitigating action from among the plural different mitigating actions responsive to the one or more operational parameters indicate that the vehicle system is travelling over or toward a second grade.

9. The system of claim 8, wherein the one or more processors are further configured to calculate a quantifiable risk assessment index, representative of at least one of a magnitude of a safety risk or an immediacy of the safety risk of the vehicle system, based on the alarm state and the one or more operational parameters.

10. The system of claim 9, wherein the selected mitigating action is selected from among the plural different mitigating actions based on the quantifiable risk assessment index.

11. The system of claim 9, wherein the risk assessment index represents one or more weighted values of the alarm state and the one or more operational parameters, and the one or more processors are further configured to select one or more mitigating actions responsive to the risk assessment exceeding a predetermined threshold.

12. The system of claim 8, wherein the operational parameters includes plural different moving speeds.

13. The system of claim 12, wherein the selected mitigating action includes reducing the current moving speed of the vehicle system by an amount that is proportional to a severity of the alarm.

14. The system of claim 8, wherein the selected mitigating action includes changing a route being travelled on by the vehicle system from a first route to a second route, the first route headed toward an area that is more congested with at least one of other vehicle systems or buildings than the second route.

15. A system comprising:
a guidance controller configured to identify one or more operational parameters of a vehicle system having one or more sensors configured to inspect one or more components of the vehicle system to generate an alarm state based on one or more characteristics of the one or more components, the operational parameters representing at least one of a current location of the vehicle system, a current terrain over which the vehicle system is currently travelling, an upcoming terrain that the vehicle system is travelling toward, a current moving speed of the vehicle system, a position of one or more controls of the vehicle system, a state of a brake of the vehicle system, or an identification of one or more vehicle units in the vehicles system; and
one or more processors configured to be communicably coupled with the one or more sensors and the guidance controller, the one or more processors configured to implement one or more mitigating actions selected from plural different mitigating actions, each of the plural different mitigating actions having an associated quantifiable risk assessment index based on the alarm state and the one or more operational parameters of the vehicle system, the one or more processors configured to select the one or more mitigating actions to implement based on the risk assessment indices, wherein the selected mitigating action includes changing a route being travelled on by the vehicle system from a first route to a second route, the first route headed toward an area that is more congested with at least one of other vehicle systems or buildings than the second route.

16. The system of claim 15, wherein the quantifiable risk assessment index is representative of at least one of a magnitude of a safety risk, or an immediacy of the safety risk of the vehicle system.

17. The system of claim 15, wherein the risk assessment index represents one or more weighted values of the alarm state and the one or more operational parameters, and wherein the one or more processors are further configured to select the one or more mitigating actions responsive to the risk assessment exceeding a predetermined threshold.

18. The system of claim 15, wherein the selected mitigating action includes reducing the current moving speed of the vehicle system by an amount that is proportional to a severity of the alarm.

19. A method comprising:
  receiving an alarm state from one or more sensors that inspect one or more components of a vehicle system, the alarm state indicating at least one of a type of alarm, a severity of the alarm, or a location of a defect causing the alarm;
  identifying one or more operational parameters of the vehicle system, the operational parameters representing at least one of a current location of the vehicle system, a current terrain over which the vehicle system is currently travelling, an upcoming terrain that the vehicle system is travelling toward, a current moving speed of the vehicle system, a position of one or more controls of the vehicle system, a state of a brake of the vehicle system, or an identification of one or more vehicle units in the vehicle system;
  selecting with one or more computer processors, a selected mitigating action to implement, the selected mitigating action selected from plural different mitigating actions based on the alarm state and the one or more operational parameters of the vehicle system, wherein the selected mitigating action includes changing a route being travelled on by the vehicle system from a first route to a second route, the first route headed toward an area that is more congested with at least one of other vehicle systems or buildings than the second route; and
  implementing, with the one or more computer processors, the mitigating action in response to the alarm state.

20. A system comprising:
  a guidance controller configured to identify one or more operational parameters of a vehicle system, the operational parameters representing at least one of a current location of the vehicle system, a current terrain over which the vehicle system is currently travelling, an upcoming terrain that the vehicle system is travelling toward, a current moving speed of the vehicle system, a position of one or more controls of the vehicle system, a state of a brake of the vehicle system, or an identification of one or more vehicle units in the vehicle system; and
  one or more processors communicably coupled to one or more sensors of the vehicle system and coupled to the guidance controller, the one or more processors configured to select one or more mitigating actions to implement selected from plural different mitigating actions based on an alarm state generated by the one or more sensors based on characteristics of one or more components of the vehicle system and based on the one or more operational parameters of the vehicle system, the one or more processors also configured to implement the mitigating action in response to the alarm state, wherein the selected mitigating action includes changing a route being travelled on by the vehicle system from a first route to a second route, the first route headed toward an area that is more congested with at least one of other vehicle systems or buildings than the second route.

* * * * *